United States Patent [19]

Domyan

[11] 3,985,334
[45] Oct. 12, 1976

[54] BALL VALVE

[75] Inventor: Frank F. Domyan, Canoga Park, Calif.

[73] Assignee: International Telephone and Telegraph Corporation, New York, N.Y.

[22] Filed: June 25, 1975

[21] Appl. No.: 590,048

Related U.S. Application Data

[60] Division of Ser. No. 491,404, July 24, 1974, Pat. No. 3,961,651, which is a continuation-in-part of Ser. No. 372,203, June 21, 1973, abandoned.

[52] U.S. Cl. .............................. 251/159; 137/315; 251/174; 251/315
[51] Int. Cl.² ........................................ F16K 25/00
[58] Field of Search .................. 251/159, 172, 315; 137/315

[56] References Cited
UNITED STATES PATENTS

| | | | |
|---|---|---|---|
| 3,037,738 | 6/1962 | Jackson | 251/172 |
| 3,134,396 | 5/1964 | Bredtschneider | 137/315 |
| 3,463,448 | 8/1969 | Picardo | 251/159 |
| 3,565,392 | 2/1971 | Bryant | 251/159 |
| 3,795,384 | 3/1974 | Reddy | 251/315 X |
| 3,890,991 | 6/1975 | Grove | 251/159 X |

Primary Examiner—Harold W. Weakley
Attorney, Agent, or Firm—A. Donald Stolzy

[57] ABSTRACT

A ball valve with an actuator wherein a seal assembly with a combination O-ring swivel and seal for producing a tight seal is hidden in a pocket isolated from the flow of fluid through the valve by an inlet reentrant flange and the valve body. The swivel and other parts of the seal assembly including but not limited to the seal thereof, because the O-ring swivel makes the seal assembly mount tenuous and subject to chattering and vibration, can be damaged. This is true because the seal assembly seal receives large and rapid impact loads. The chattering and vibration also thereby produce serious damage to and wear on the seal assembly seal. A great deal of chattering and vibration is usually caused by exposing the seal assembly to the fluid passing through the valve. In the ball valve disclosed herein this is prevented by mounting the seal assembly in the isolated pocket. The valve disclosed herein also has other features. For example, eccentrics release the seal assembly spring for assembly and disassembly of the ball and other component parts. Access for repair or otherwise is also provided even though the valve has an actuator mounted thereon and is welded into a pipeline. A composite two-layer seal assembly seal is provided for low temperatures.

2 Claims, 8 Drawing Figures

BALL VALVE

This is a divisional application of copending application Ser. No. 491,404 filed July 24, 1974, now U.S. Pat. No. 3,961,651 for BALL VALVE. Said application Ser. No. 491,404 was, in turn, a continuation-in-part of copending application Ser. No. 372,203 filed June 21, 1973, of the same title, but now abandoned. The benefits of the filing dates of both of said copending applications are, therefore, hereby claimed.

BACKGROUND OF THE INVENTION

This invention relates to fluid control apparatus, and more particularly to a ball valve and/or an actuator therefor.

In the past, a ball valve has been provided with an actuator and seal assembly exposed to the fluid flow. This seal has been susceptible to chattering and vibration because of the direct contact with the flow. The present invention is even more susceptible to such chattering and vibration because of a swivel mount to improve sealing.

Prior art exposed seal assemblies are susceptible to damage and to serious wear because of the chattering and vibration. This is true because the seal assembly seal receives large and rapid impact loads.

Prior art valves also scratch and damage seals on assembly or disassembly for repair or otherwise.

In the prior art in high pressure gas line it is also often the practice to use a power driven ball valve actuator and weld the ball valve in a pipeline with no access for repair or otherwise without cutting the valve out of the line with a torch and/or disassembling the actuator.

Prior art ball valves also consistently are provided with seals that fail to seal at low temperatures and/or have poor wear characteristics.

SUMMARY OF THE INVENTION

In accordance with the present invention, the above-described and other disadvantages of the prior art are overcome by providing a ball valve with or without an actuator wherein a seal with a combination O-ring swivel and seal for producing a tight seal is hidden in a pocket isolated from the flow of fluid through the valve by a port reentrant flange and the valve body. The swivel and other parts of the seal assembly including but not limited to the seal thereof, because the O-ring swivel makes the seal assembly mount tenuous and subject to chattering and vibration, can be damaged. This is true because the seal assembly seal receives large and rapid impact loads. The chattering and vibration also thereby produce serious damage to and wear on the seal assembly seal. A great deal of chattering and vibration is usually caused by exposing the seal assembly to the fluid passing through the valve as aforesaid. In the ball valve of the present invention this is prevented by mounting the seal assembly in the isolated pocket. The pocket mounting also reduces flow resistance.

The valve disclosed herein also has other features. For example, eccentrics release the seal assembly spring for assembly and disassembly of the ball and other component parts.

Access for repair or otherwise is also provided even though the valve has an actuator mounted thereon and is welded into a pipeline. That is, access is provided without cutting the valve out of a pipeline after being welded thereinto or without disassembling the actuator.

A composite two-layer seal assembly seal is also provided in accordance with the present invention for low temperatures.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
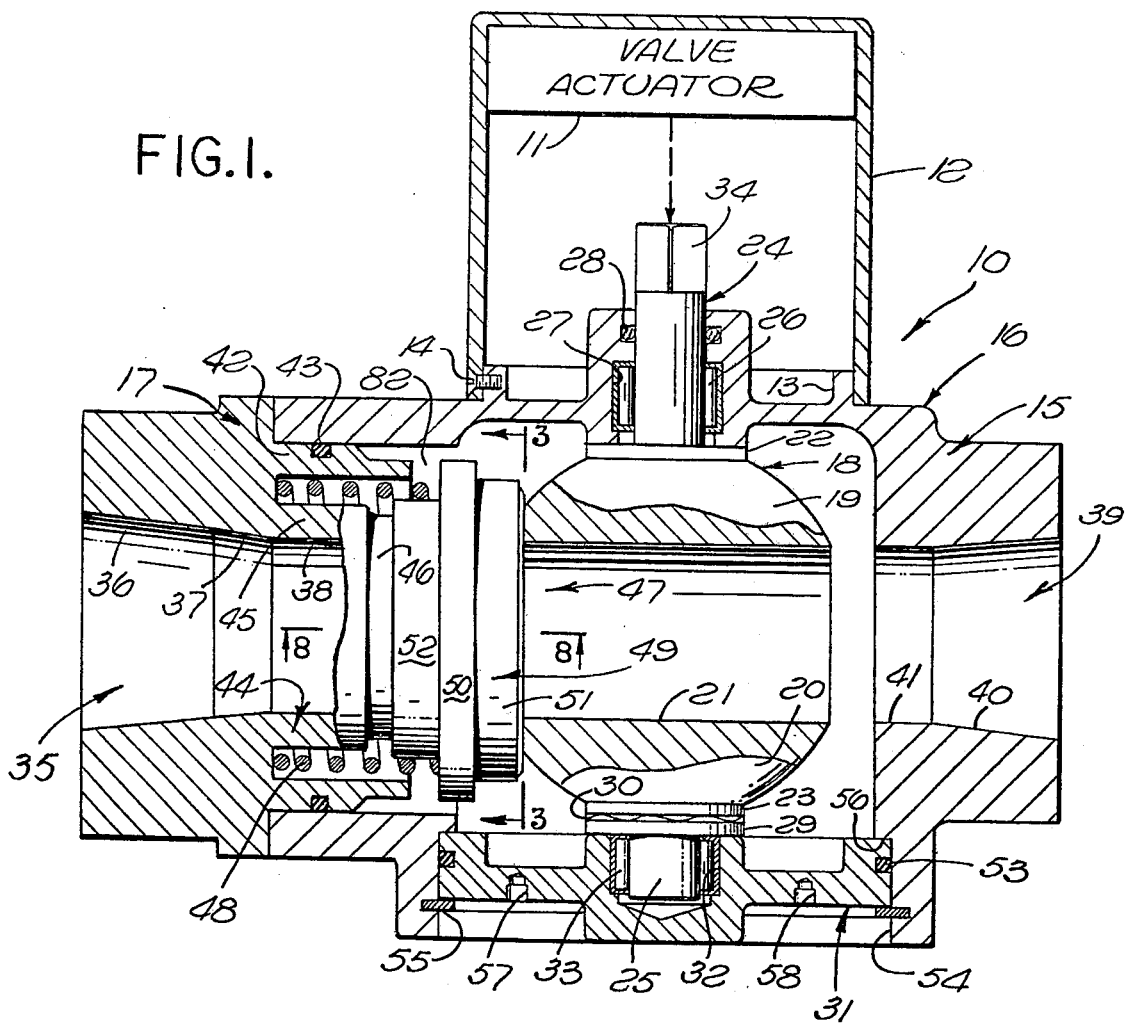
FIG. 1 is a longitudinal sectional view of a ball valve constructed in accordance with the present invention, and a valve actuator therefor, the former being partly in elevation.

In FIG. 1, a ball valve is illustrated at 10 having an actuator 11 fixed within a housing 12. Housing 12 is secured to a boss 13 by one, two, three, four or more countersunk setscrews 14. Boss 13 is annular in shape and integral with a portion 15 of a valve body 16, valve body 16 having another portion 17 fixed thereto by welding or otherwise.

Ball valve 10 includes a ball 18 having surfaces 19 and 20 which are portions of a sphere, and a hollow cylindrical bore 21 extending completely therethrough.

If desired, valve actuator 11 may be identical to that disclosed in the said copending application Ser. No. 374,033.

Disks 22 and 23 are fixed to the upper and lower ends of ball 18, respectively.

Stub shafts 24 and 25 are fixed to disks 22 and 23, respectively.

Stub shaft 24 is rotatable in bearings 26 carried in a bore 27 in portion 15 of valve body 16.

An O-ring 28 seals stub shaft 24 to portion 15 of valve body 16.

A washer 29 is provided below disk 23 around stub shaft 25, clearance, not shown, being provided between stub shaft 25 and washer 29 so that stub shaft 25 can rotate relative thereto. A wave spring 30 is positioned between disk 23 and washer 29. A plate 31 is provided at the lower end of valve body 16, as viewed in FIG. 1. Plate 31 has a recess 32. Stub shaft 25 is rotatable in bearings 33 located in recess 32.

Upper end 34 of stub shaft 24 may be square, if desired, for connection with valve actuator 11.

Valve body 16 has an inlet 35 with a frusto-conical portion 36, another frusto-conical portion 37, and a hollow cylindrical portion 38.

Ball valve 10 also has an outlet 39 with a frusto-conical portion 40 and a cylindrical portion 41.

Portion 17 of valve body 16 has a projection 42 which carries an O-ring 43 that seals the same to valve body portion 15.

Valve body portion 17 has a reentrant cylinder 44, the internal surface of which is the cylindrical surface 38. Cylinder 44 has a portion 45 but continues at 46 toward the right, as viewed in FIG. 1, at a slightly smaller diameter.

Ball valve 10 also has a seal assembly 47, a portion of which includes a spring 48 to urge the seal of the seal assembly 47, not shown in FIG. 1, against the spherical surfaces 19 and 20.

Seal assembly 47 also has a channel member 49 and a ring 50. Channel member 49 has one portion 51 and another portion 52.

An O-ring 53 seals plate 31 to valve body portion 15, and more particularly to a bore 54 therein. A snap ring 55 holds plate 31 against a shoulder 56 of valve body portion 15.

Spanner wrench holes 57 and 58 are provided in plate 31 for its removal from bore 54.

Figure 2:
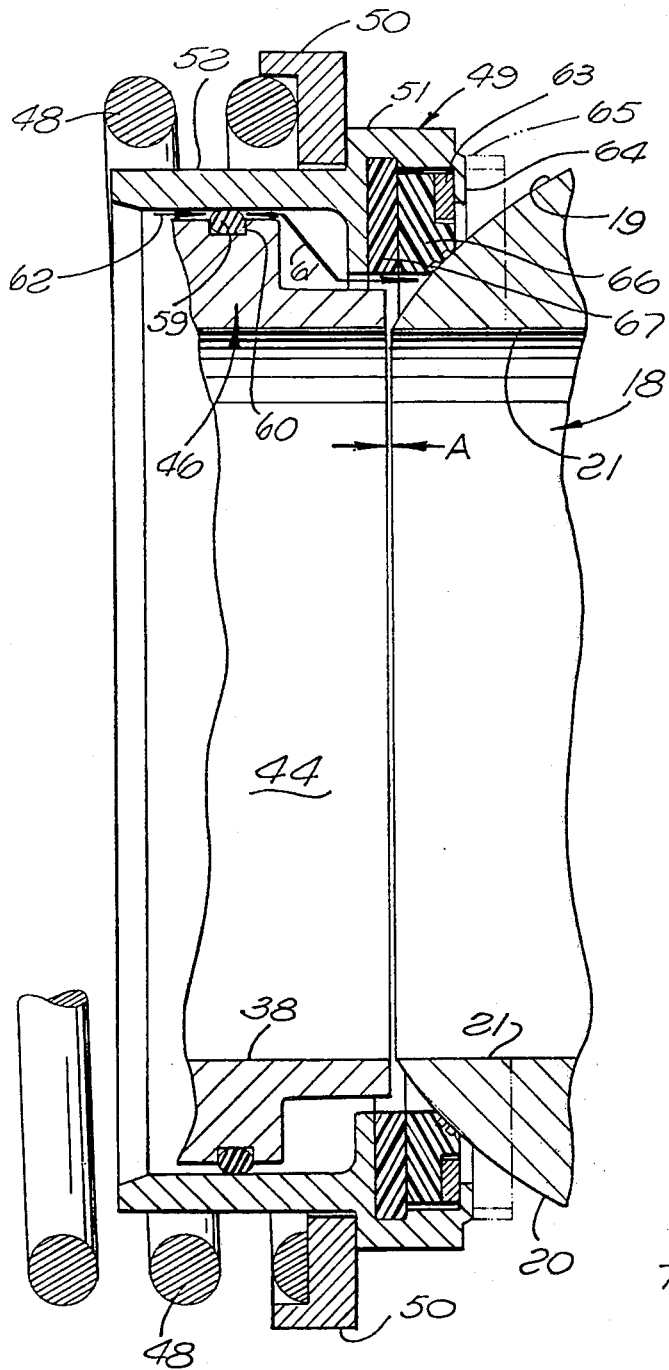
FIG. 2 is a substantially enlarged sectional view of a seal assembly shown in FIG. 1.

As shown in FIG. 2, an O-ring is provided at 59 in an O-ring groove 60 in the external cylindrical surface of portion 46 of reentrant cylinder 44. Moreover, a space is provided as indicated by arrows 61 and 62 so that channel member 49 can swivel or rock a short distance such that the axis of the external cylindrical surface of portion 52 thereof rotates in a plane substanatially through the axis of hole or bore 21 through ball 18.

Continuous support of channel member 49 on O-ring 59 could make it subject to vibration and damage and wear and to all the disadvantages thereof aforesaid. However, this is prevented because reentrant cylinder 44 protects everything around it to the point where it is contiguous to but does not touch and is spaced from ball 18 a distance indicated at A.

Many of the features of the invention will thus be apparent from inspection of FIGS. 1 and 2.

Other features of the invention are also illustrated in FIG. 2 where a metal ring 63 is held in a channel formed in member 49 by an annular flange 64 staked over from a location indicated at 65.

ring 63 holds a wear ring 66 and a rubber-like ring 67 in place in channel member 49. Wear ring 66 may be a conventional material purchased from any number of companies including the Du Pont Company. Wear ring 66 may be a conventional material called "linear polyethylene compound."

If desired, rubber-like ring 67 may actually be rubber which is softer than the wear ring 66 at predetermined low temperatures such as at a temperature of minus 20° F. or temperatures lower than minus 20° F.

Wear ring 66 has wear characteristics superior to those of rubber-like ring 67. Wear ring 66 also slides more easily over spherical portions 19 and 20 of ball 18 than would rubber-like ring 67.

The arrangement shown in FIG. 2 is employed for several reasons, one of which is to insure a tight seal between wear ring 66 and ball 18 at the said predetermined low temperatures. As a practical matter, wear ring 66 warps perhaps somewhat in the shape of a wave spring at the said predetermined low temperatures. Rubber-like ring 67, on the other hand, stays relatively soft, but resilient, and forces wear ring 66 against ball 18 and provides a good fluid tight seal thereat at said predetermined low temperatures.

Figure 3:
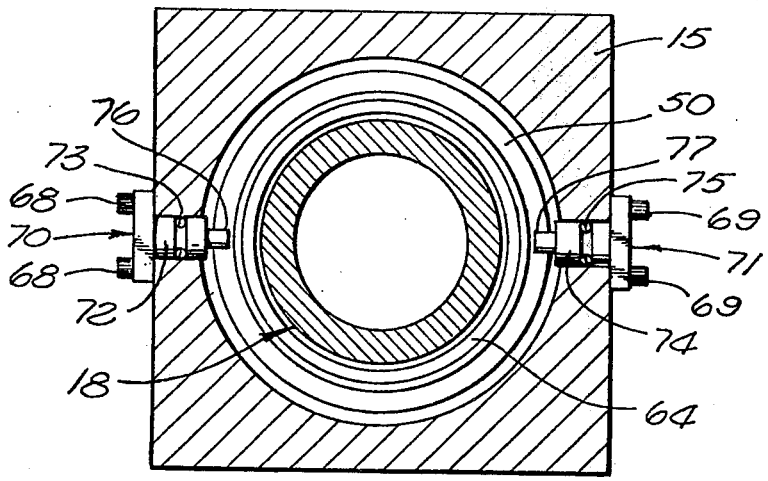
FIG. 3 is a transverse sectional view, partly in elevation, of the ball valve taken on the line 3—3 shown in FIG. 1.

In FIG. 3, rings 63, 66 and 67, and portions of channel member 49 rearward of the forward surface of rubber-like ring 67, i.e. to the right in FIG. 2, have been omitted in FIG. 3 for clarity. The arrangement of FIG. 3 is employed to press ring 50 to the left, as viewed in FIGS. 1 and 2, to make ring 50 abut projection 42 or bottom thereon, or to come closely thereto. This takes the axial forward force of spring 48 off of wear ring 66, and upon disassembly for cleaning, repair or otherwise, plate 31 may be removed by taking out snap ring 55 shown in FIG. 1, and ball 18 lowered vertically through bore 54. Seal assembly 47 can then easily slide to the left without scratching wear ring 66.

In accordance with the foregoing, ring 50 is moved to the left, as viewed in FIG. 2, by removing cap screws 68 and 69, as shown in FIG. 3, and turning plates 70 and 71 180°, and returning cap screws 68 and 69 to the locations shown in FIG. 3. Plates 70 and 71 are turned in the locations shown in FIG. 3. That is, they are turned in place.

Plate 70 has a cylindrical shaft 72 integral therewith which is sealed to body portion 15 by an O-ring 73. Similarly, plate 71 has a cylindrical shaft 74 integral therewith which is sealed to valve body portion 15 by an O-ring 75. Shafts 72 and 74 are rotatable through valve body portion 15.

Shaft 72 has an eccentric 76 fixed thereto. Shaft 74 has an eccentric 77 fixed thereto.

Figure 4:
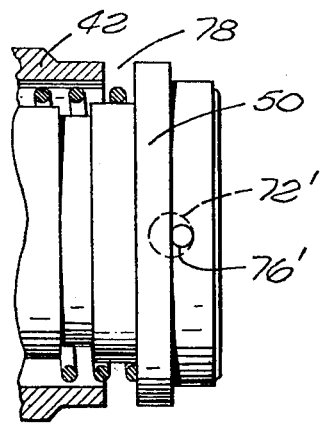
FIG. 4 is an operational view of the seal assembly when in engagement with the ball of the ball valve.

When ring 50 is in the position shown in FIG. 1 eccentric 76 is located at circle 76' in FIG. 4, and shaft 72 is located at 72'. In FIG. 4, notice that there is a space 78 between ring 50 and projection 42. There is no such space in FIG. 5.

Figure 5:
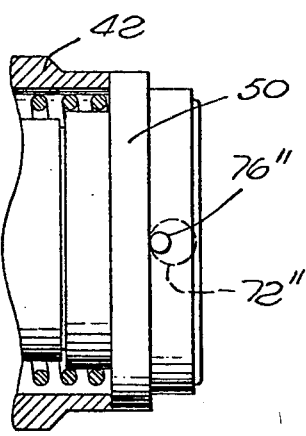
FIG. 5 is an operational view of the seal assembly when the force of the spring on the seal thereof has been removed.

In FIG. 5, the shaft 72 at location 72" has been turned 180° to relocate eccentric 76 at 76".

Cap screws 68 may be identical to cap screws 69. Plate 70, shaft 72, O-ring 73, and eccentric 76 may be identical to plate 71, shaft 74, O-ring 75 and eccentric 77, respectively.

It will be noted that the cylindrical surfaces of shafts 72 and 74 have a common axis.

Figure 6:
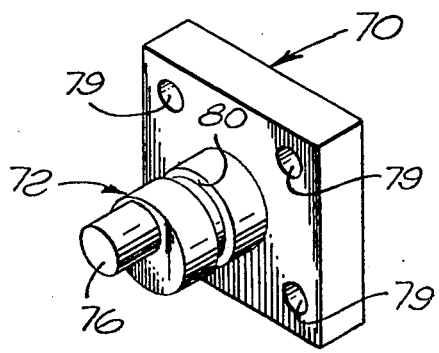
FIG. 6 is a perspective view of an eccentric assembly illustrated in FIG. 3.

As shown in FIG. 6, plate 70 is square and has four holes 79 symmetrically spaced about the axis of shaft 72. Shaft 72 has an O-ring groove 80 to receive O-ring 73. Plate 70, shaft 72 and eccentric 76 all may be integral, if desired.

Figure 7:
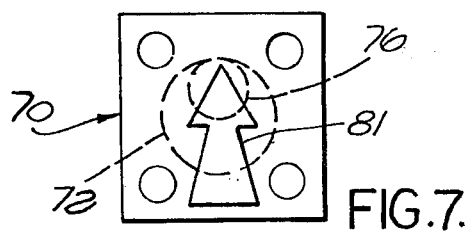
FIG. 7 is a top plan view of the eccentric assembly shown in FIG. 6.

As shown in FIG. 7, if desired, the top of plate 70 may be provided with an arrow 81 to show that eccentric 76 is located on the upper half of shaft 72.

From the foregoing, it will be appreciated that the spaces indicated by arrows 61 and 62 in FIG. 2 with the O-ring 59 make it possible to provide a better seal between wear ring 66 and ball 18. However, at the same time, O-ring 59 thereby provides a tenuous mounting for channel member 49. The seal assembly 47 including spring 48, ring 50, channel member 49, ring 63, wear ring 66 and rubber-like ring 67 is thus subject to vibration and has all of the said disadvantages thereof set forth hereinbefore. However, all the structures listed in the sentence second preceding this one are protected by the reentrant cylinder 44 which is or can be an isotropic extension of valve body portion 17 that, with valve body portion 15, forms a pocket 82 as shown in FIG. 1 in which the seal assembly 47 is located and isolated from the flow except for the small space A between the right end of cylinder 44 shown in FIG. 2, and as viewed in FIG. 2, and ball 18.

As shown in FIG. 3, the eccentrics 76 and 77 form convenient means for preventing damage or scratching of wear ring 66.

As shown in FIG. 1, plate 31 may be removed by removal of snap ring 55. That is, plate 31 may be removed from bore 54 after ring 50 has been moved to the position shown in FIG. 5, and ball 18 with stub shafts 24 and 25 may be slidably removed downwardly through bore 54 so that it or any part of the ball valve 10 may be cleaned, repaired or otherwise operated upon without damaging or scratching wear ring 66 or removing housing 12 or disconnecting valve actuator 11.

In addition to the foregoing, the use of the wear rings 66 and 67 provides an unusually good fluid tight seal over a very wide range of temperatures, and especially over a range of temperatures whose upper limit is minus 20° F.

It is another advantage of the present invention that the matching bores 38 and 21 in FIG. 2 with a small separation at A provide a low flow resistance for the ball valve 10 and that the pressure drop thereacross is unusually low.

The word "eliminate" as used anywhere herein and as used in the claims is here defined to mean "completely eliminate" or to mean "partly eliminate." This word "eliminate" is used in connection with the removal of force on wear ring 66 to press it against ball 18, the said force being supplied by spring 48 and being relieved by movement of ring 50 by rotation of eccentric shafts 72 and 74.

Figure 8:
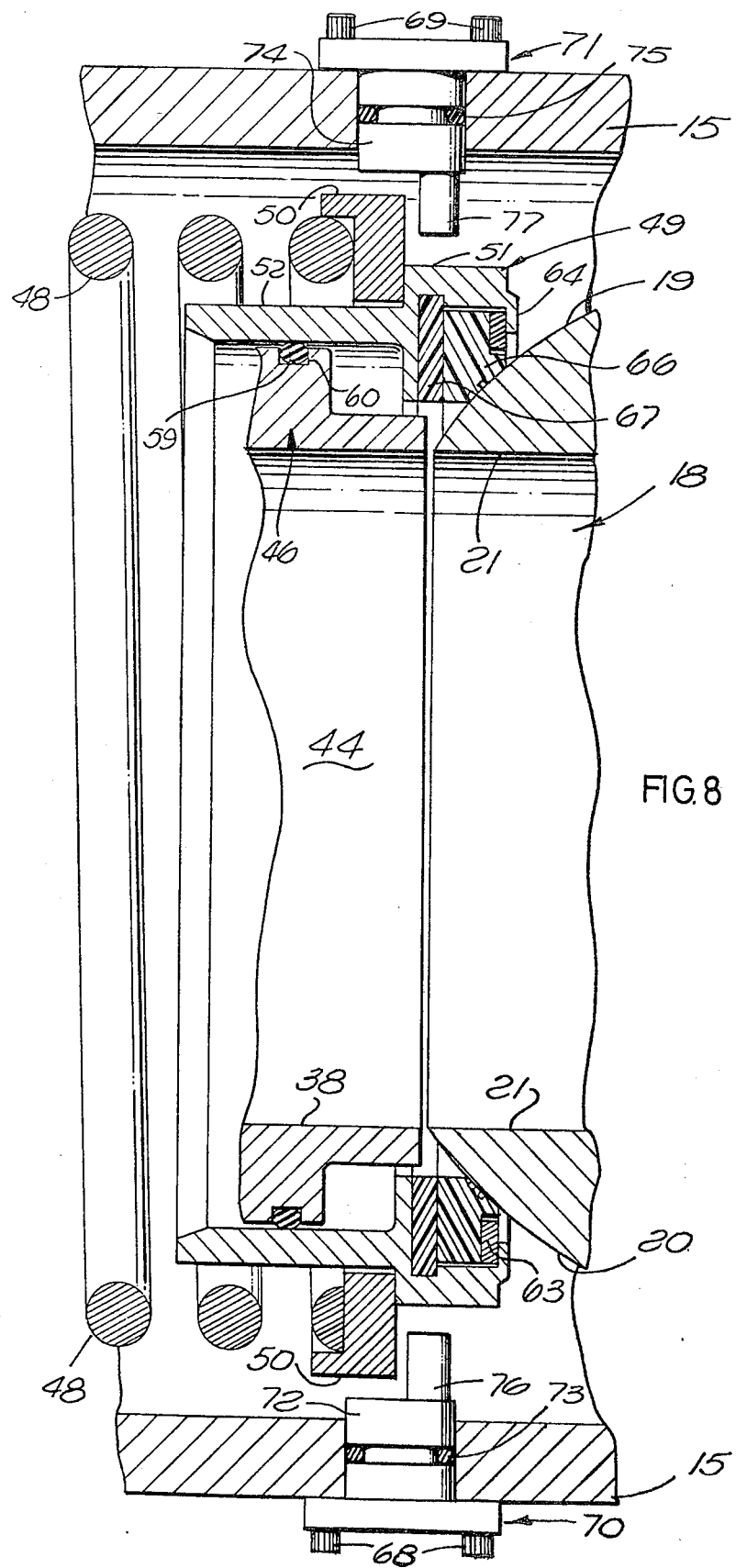
FIG. 8 is a longitudinal sectional view of the ball valve taken on the line 8—8 shown in FIG. 1.

FIG. 8 is a longitudinal sectional view of the ball valve taken on the line 8—8 shown in FIG. 1.

What is claimed is:

1. Fluid control apparatus comprising: a valve body having first and second ends with first and second openings respectively, extending completely therethrough generally along a first axis, said valve body having internal circumferential wall means substantially defining a chamber intermediate of said first and second valve body ends; a ball mounted on said wall means in a manner to rotate about a second axis substantially normal to said first axis, said ball having spherical surface portions around a cylindrical hole extending completely therethrough defined by an internal surface alignable with said valve body first end first opening, said alignment being made possible by the rotatability of said ball; a seal assembly sealing said valve body first end first opening to said ball, said seal assembly including an annular seal extending around said hole at a diameter greater than that of said hole when said alignment occurs; and bias means mounted between said valve body and said seal assembly to force said seal into fluid tight engagement with said ball, said first and second openings being in communication with each other during said alignment, said ball being rotatable to a position cutting off all communication between said first and second openings; and movable means engageable with said seal assembly to move at least a portion thereof in a direction to eliminate the force produced by said bias means which would otherwise cause said seal to be pressed into fluid tight engagement with said ball to permit easy movement of said ball and seal assembly relative to each other, said seal assembly including a ring approximately concentric with said first axis, said bias means including a spring to bias said ring toward said ball, said movable means including first and second shafts rotatable through and sealed through said wall means on about the same third axis about normal to said first axis and on respective opposite sides of said valve body, means to hold said first and second shafts in at least substantially fixed axial positions along said third axis, each of said first and second shafts having an eccentric thereon inside said chamber engageable and disengageable with said ring to move the same to put the pressure of said seal on and take it off of said ball, respectively, by forcing said ring and said spring in a direction toward and away from said ball, respectively.

2. The invention as defined in claim 1, wherein said valve body has an annular shoulder engageable by said ring when said ring is moved far enough away from said ball by rotation of said eccentrics through rotation of said shafts.

* * * * *